United States Patent
Heatherly et al.

(10) Patent No.: US 9,501,729 B2
(45) Date of Patent: Nov. 22, 2016

(54) MICROTRANSACTIONAL ASSOCIATION OF PHYSICAL AND VIRTUAL ACCESSORIES

(75) Inventors: Chris Heatherly, Monrovia, CA (US); Randal Ouye, La Crescenta, CA (US); Bobby Saygan, Ladera Ranch, CA (US); Natasha Berling, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1478 days.

(21) Appl. No.: 12/291,764

(22) Filed: Nov. 12, 2008

(65) Prior Publication Data

US 2010/0116890 A1 May 13, 2010

(51) Int. Cl.
*G06K 19/00* (2006.01)
*A63F 13/30* (2014.01)
*G06Q 30/06* (2012.01)
*A63F 13/95* (2014.01)

(52) U.S. Cl.
CPC .............. *G06K 19/00* (2013.01); *A63F 13/12* (2013.01); *G06Q 30/06* (2013.01); *A63F 13/95* (2014.09); *A63F 2300/206* (2013.01); *A63F 2300/5526* (2013.01)

(58) Field of Classification Search
USPC ........................................................ 235/487
See application file for complete search history.

(56) References Cited

U.S. PATENT DOCUMENTS

| | | | |
|---|---|---|---|
| 6,152,298 A * | 11/2000 | Dods | 206/335 |
| 7,004,398 B1 * | 2/2006 | Francis | G06K 19/00 235/380 |
| 7,810,710 B2 * | 10/2010 | Halbur et al. | 235/375 |
| 2005/0059483 A1 * | 3/2005 | Borge | 463/29 |

FOREIGN PATENT DOCUMENTS

| EP | 1933269 | 6/2008 |
|---|---|---|
| WO | WO2006/041757 | 4/2006 |

* cited by examiner

*Primary Examiner* — Rafferty Kelly
(74) *Attorney, Agent, or Firm* — Farjami & Farjami LLP

(57) ABSTRACT

There is provided a stored value card comprising a physical accessory being a portion of the stored value card and being detachable from the stored value card, wherein the physical accessory is configured to be attached to a physical primary; and a unique identification code, wherein the unique identification code is associated with the stored value card, the physical accessory and a virtual accessory, and wherein a virtual primary and the virtual accessory are stored in a network server and correspond to the physical primary and the physical accessory, respectively.

20 Claims, 4 Drawing Sheets

MICROTRANSACTIONAL ASSOCIATION OF PHYSICAL AND VIRTUAL ACCESSORIES

BACKGROUND OF THE INVENTION

1. Field of the Invention

The present invention is generally in the field of transactional methods and systems for collectable items. More particularly, the present invention relates to methods and systems for association of physical and virtual accessories for collectable items.

2. Background Art

Methods and systems for performing microtransactions, such as transactions that are characterized as involving small sums of money, have advanced rapidly as the Internet has matured. This rapid advancement has been driven, in part, by a recognition by online retail and service providers that online microtransactions are profitable in circumstances where similar transactions performed in a conventional retail setting would accrue a loss. The benefits of performing microtransactions utilizing the Internet have lead to innovation, in some cases, in markets typically reserved for traditional products and services.

For example, the market for children's toys has seen significant innovation recently as an online microtransactional model has been applied in that field. In particular, the market for children's dolls, which historically has been a market supplying physical dolls for children to play with, has recently leveraged online microtransactional techniques to provide children with virtual dolls (e.g., online avatars) to play with. Thus, utilizing the World Wide Web, for example, a child can go online, create or purchase a virtual doll, and play with the doll in an online environment in several ways, some of which mimic a child's play (e.g., dress-up play) with traditional physical dolls. For example, at the time of writing, StarDoll provides such an online environment. In such an online environment, a child can perform online microtransactions to purchase virtual clothing or other virtual accessories to associate with the virtual doll. Given the low price of such online microtransactions, online play can be much less expensive than, for example, purchasing physical clothing or other physical accessories for an equivalent traditional physical doll.

The costs associated with operating a market for physical clothing or other physical accessories for a physical doll in a conventional retail setting are, as suggested above, quite high, for a variety of reasons. For example, the cost of maintaining a physical inventory of clothes or other accessories is high in a conventional retail setting, whereas in a virtual setting the cost of maintaining virtual inventory is negligible. Operating a market for physical dolls in a conventional retail setting also entails risk because the market for children's toys is often unpredictable and fashion- or trend-driven. Consequently, circumstances may demand that a particular line of physical inventory be tossed out as unsellable, imposing a significant cost. As such, the market for physical clothing or other physical accessories for physical dolls is reserved largely for high-end or boutique stores such as, for example, American Doll.

Despite the advances made in the online market for children's toys, such as children's dolls, thanks in part to advantages derived from utilizing online microtransactional systems and methods, physical toys still remain popular. Physical toys, such as physical dolls, will most likely endure the inroads made by virtual toys into the market for children's toys, because, for example, physical toys have a tangible appeal that virtual toys have been unable to duplicate. Accordingly, there is a need to overcome the drawbacks and deficiencies in the art by offering an improved method and system for microtransactional association of physical and virtual accessories.

SUMMARY OF THE INVENTION

There are provided methods and systems for microtransactional association of physical and virtual accessories, substantially as shown in and/or described in connection with at least one of the figures, and as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to a method and system for microtransactional association of physical and virtual accessories. Although the invention is described with respect to specific embodiments, the principles of the invention, as defined by the claims appended herein, can obviously be applied beyond the specific embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
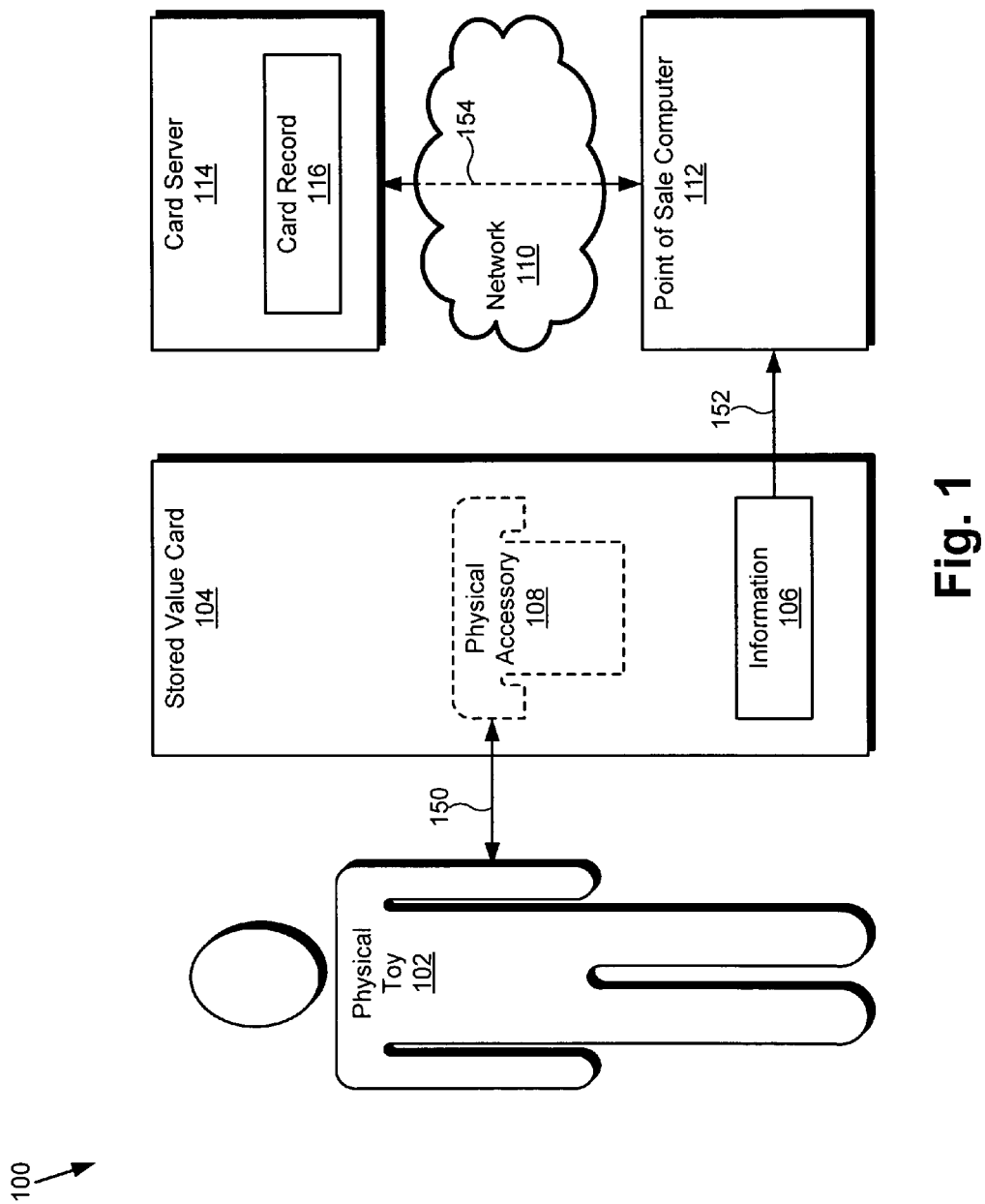
FIG. 1 shows a diagram of an exemplary system for microtransactional association of physical and virtual accessories, according to one embodiment of the present invention.
Figure 2:
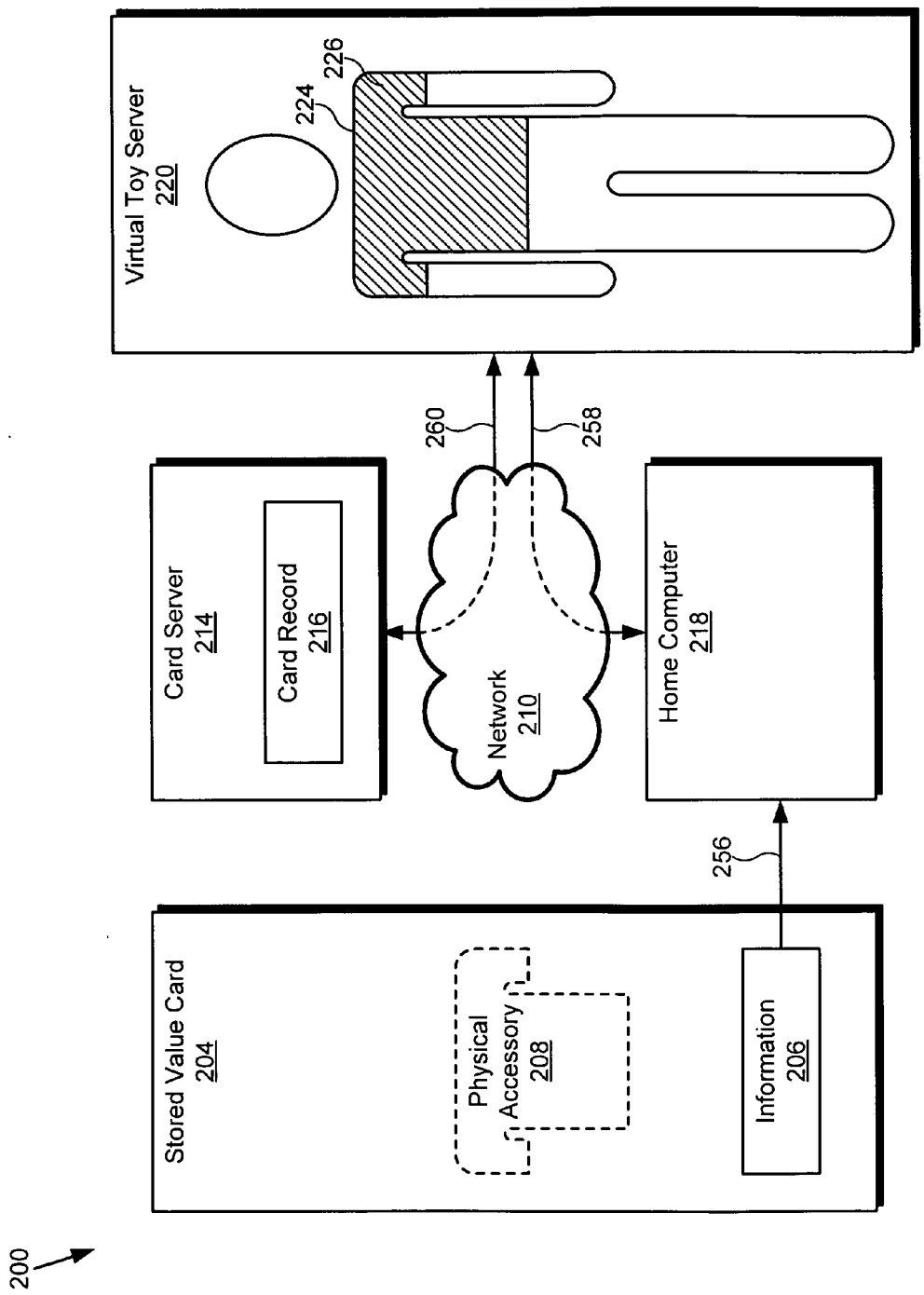
FIG. 2 shows a diagram of an exemplary system for microtransactional association of physical and virtual accessories, according to one embodiment of the present invention.

FIG. 1 shows exemplary system 100 according to one embodiment of the present invention. System 100, in addition to systems 200 and 300 shown in FIGS. 2 and 3, respectively, implements a novel microtransactional model in a retail setting. In one embodiment systems 100, 200, and 300 show, for example, the microtransactional association of physical accessory 108 with physical primary or toy 102, and of virtual accessory 226 and virtual primary or toy 224. As shown in FIG. 1, in one embodiment physical toy 102 is a child's physical doll or figurine, and as shown in FIG. 2, in one embodiment virtual toy 224 is a child's virtual doll or figurine. Virtual toy 224 is, in one embodiment, a virtual copy (e.g., digital replica, avatar, or electronic copy) of physical toy 102. Similarly, virtual accessory 226 is a virtual copy of physical accessory 208.

System 100 comprises physical toy 102, stored value card 104, point of sale computer 112, network 110, and card server 114. Stored value card 104 comprises physical accessory 108 and information 106. Point of sale computer 112 is, in one embodiment, a cash register or similar point of sale machine in a retailer, such as in a toy store or department store. Point of sale computer 112 is coupled to network 110, which comprises, in one embodiment, the Internet. Network 110 is coupled to card server 114, so that point of sale computer 112 and card server 114 may communicate via network 110. Card server 114 is, in one embodiment, a computer comprising a processor and a memory, as known in the art, and may be located in, for example, a data center with a plurality of servers.

In one embodiment, physical toy 102 belongs to, or is in the possession of, for example, a child, who brings physical toy 102 to the retailer where stored value card 104 and point of sale computer 112 are located. The child is, in one embodiment, searching for an accessory for physical toy 102, such as physical accessory 108 of stored value card 104. Physical accessory 108 is shown in FIG. 1 as a shirt for physical toy 102. However, in another embodiment where physical toy 102 is not implemented as a child's doll or figurine, and is instead implemented as a different chattel, such as a scale automobile, a book or comic book, a dollhouse, a costume mask, a board game, etc., physical accessory 108 is an accessory appropriate to that embodiment's implementation of physical toy 102.

In one embodiment, stored value card 104 is a stored value card or prepaid card, implemented as, for example, a plastic or paper card. Stored value card 104 comprises physical accessory 108 and information 106. Physical accessory 108, shown as a shirt in FIG. 1, is a portion of stored value card and is a detachable portion of stored value card 104; for example stored value card 105 is constructed, or physical accessory 108 is made, such that physical accessory 108 may be cut out of, or detached from, stored value card 104 on a dotted outline, in one embodiment, or carefully torn out of, or detached from, stored value card 104 on a die-cut line or partially-perforated line. Physical accessory 108 may then be associated with, for example, physical toy 102, as discussed in more detail in FIG. 3, below. Information 106 comprises, in one embodiment, a unique identification code or number stored as, for example, human-readable code, an optically-scannable code, a magnetic strip, or an RFID ("Radio Frequency Identification") device. Information 106 uniquely identifies or is associated with stored value card 104, physical accessory 108, and virtual accessory 226, and is communicated via point of sale computer 112.

In one embodiment, stored value card 104 has been consigned to the retailer by a stored value card specialist (e.g., Incomm or Blackhawk Network). Maintaining a consigned inventory of stored value cards has several advantages to the retailer over maintaining another form of inventory comprising physical accessories (e.g. standalone physical accessories such as manufactured clothing accessories for a child's doll or figurine). For example, because stored value card 104 can be consigned to the retailer, instead of sold to the retailer, the cost to the retailer of maintaining an inventory of stored value cards is negligible, because the retailer is not required to make a large monetary outlay to purchase the inventory. Additionally, a stored value card specialist can provide, in one embodiment, a refresher service to keep the retailer's inventory of stored value cards current, fashionable, or in line with trends. Thus, for example, if the retailer maintained an inventory of standalone physical accessories, those might only be refreshed, for example, twice a year, because of the cost of replacing an inventory of standalone physical accessories is high (e.g., discarding or selling at a loss an inventory of manufactured clothing accessories is expensive to the retailer). However, by maintaining an inventory of stored value cards, the retailer may refresh or replace that inventory on, for example, a weekly basis.

As stated above, in one embodiment a child brings physical toy 102 to the retailer where stored value card 104 and point of sale computer 112 are located. The child, on a shopping trip, in one embodiment locates in transaction 150 stored value card 104 comprising physical accessory 108, which is, for example, a shirt suitable for physical toy 102. Subsequently, the child takes stored value card 104 to point of sale computer 112 (e.g., to a cash register). Utilizing a bar code scanner, for example, a clerk scans information 106 of stored value card 104 in transaction 152. Point of sale computer 112 then communicates information 106 to card server 114 in transaction 154 via network 110. Card server 114 is maintained, in one embodiment, by the stored value card specialist that consigned the inventory of stored value cards to the retailer. Card server 114 stores card record 116, which is a record containing data about, for example, whether information 106 is valid and whether stored value card 104 has been purchased. After transaction 154, card server 114 has activated card record 116. A subsequent inquiry to card server 114 will show that stored value card 104 has been purchased.

FIG. 2 shows exemplary system 200 according to one embodiment of the present invention. System 200 comprises stored value card 204, home computer 218, network 210, card server 214, and virtual toy server 220. Stored value card 204, network 210, and card server 214 correspond, respectively, to stored value card 104, network 110, and card server 114 shown in FIG. 1. Thus, stored value card 204 comprises physical accessory 208 and information 206 corresponding to physical accessory 108 and information 106, respectively, shown in FIG. 1. Network 210, like network 110, comprises, in one embodiment, the Internet. Card server 214, like card server 114, is in one embodiment a computer comprising a processor and a memory, as known in the art, and may be located in, for example, a data center with a plurality of servers. Card server 214 comprises card record 216, which corresponds to card record 116.

In one embodiment, home computer 218 is a desktop or laptop computer, for example, comprising a processor and a memory, for personal use as known in the art. Additionally, virtual toy server 220, in one embodiment, is a computer comprising a processor and a memory, as known in the art, and may be located in, for example, a data center with a plurality of servers. Home computer 218, virtual toy server 220, and card server 214 are configured to communicate via network 210 during transactions 258 and 260.

As discussed above, a child in possession of physical toy 102 purchases stored value card 204 at a retailer, and a clerk at the retailer activates stored value card 204, utilizing information 206 and point of sale computer 112 to activate card record 216. Subsequently, in one embodiment the child takes physical toy 102 (not shown in FIG. 2) and stored value card 204 home. At home, the child can utilize stored value card 204 to associate virtual accessory 226 with virtual toy 224 of virtual toy server 220 by utilizing information 206.

In one embodiment, virtual toy server 220 is configured to provide a virtual toy website via network 210 (e.g., via the Internet). The virtual toy website is configured, in one embodiment, to provide website accounts to multiple users including, for example, the child. A website account of virtual toy server 220 has several features, including, for example, a feature for providing virtual toy 224 for children. Virtual toy 224 is shown as a child's doll or figurine in FIG. 2, and in one embodiment is designed implemented as website account data of virtual toy server 220. Virtual toy 224 is thus not a tangible chattel like physical toy 102, for example. However, in one embodiment, virtual toy server 220 is configured to provide an image of virtual toy 224 that is similar to or identical to the appearance of physical toy 102 on, for example, a screen of home computer 218. Virtual toy 224 is thus in one embodiment a virtual copy of physical toy 102. In one embodiment, virtual toy 224 is not implemented as website account data representing a child's doll or figurine, and is instead implemented as a website account data representing another object (e.g., representing a scale automobile, a book or comic book, a dollhouse, a costume mask, a board game, etc.).

In one embodiment, the child utilizes home computer 218 to log in to or to activate a website account of the virtual toy website provided by virtual toy server 220. Once logged in to the website account, the child provides information 206 via home computer 218 to virtual toy server 220 in transactions 256 and 258. Utilizing information 206, in one embodiment virtual toy server 220 communicates with card server 214 to determine whether card record 216, associated with stored value card 204, has been activated. Card record 216 has been activated, and thus card server 214 responds to virtual toy server 220 in the affirmative to conclude transaction 260. Card server 214 is, in one embodiment, also configured to provide information about virtual accessory 226 to virtual toy server 220. In one embodiment, virtual toy server 220 is configured to provide an image of virtual accessory 226 that is designed to be similar to or identical to the appearance of physical accessory 208 on, for example, a screen of home computer 218. Virtual accessory 226 is thus in one embodiment a virtual copy of physical accessory 108. Thus, in transactions 256, 258, and 260, the child causes virtual accessory 226 to be associated with virtual toy 224.

Figure 3:
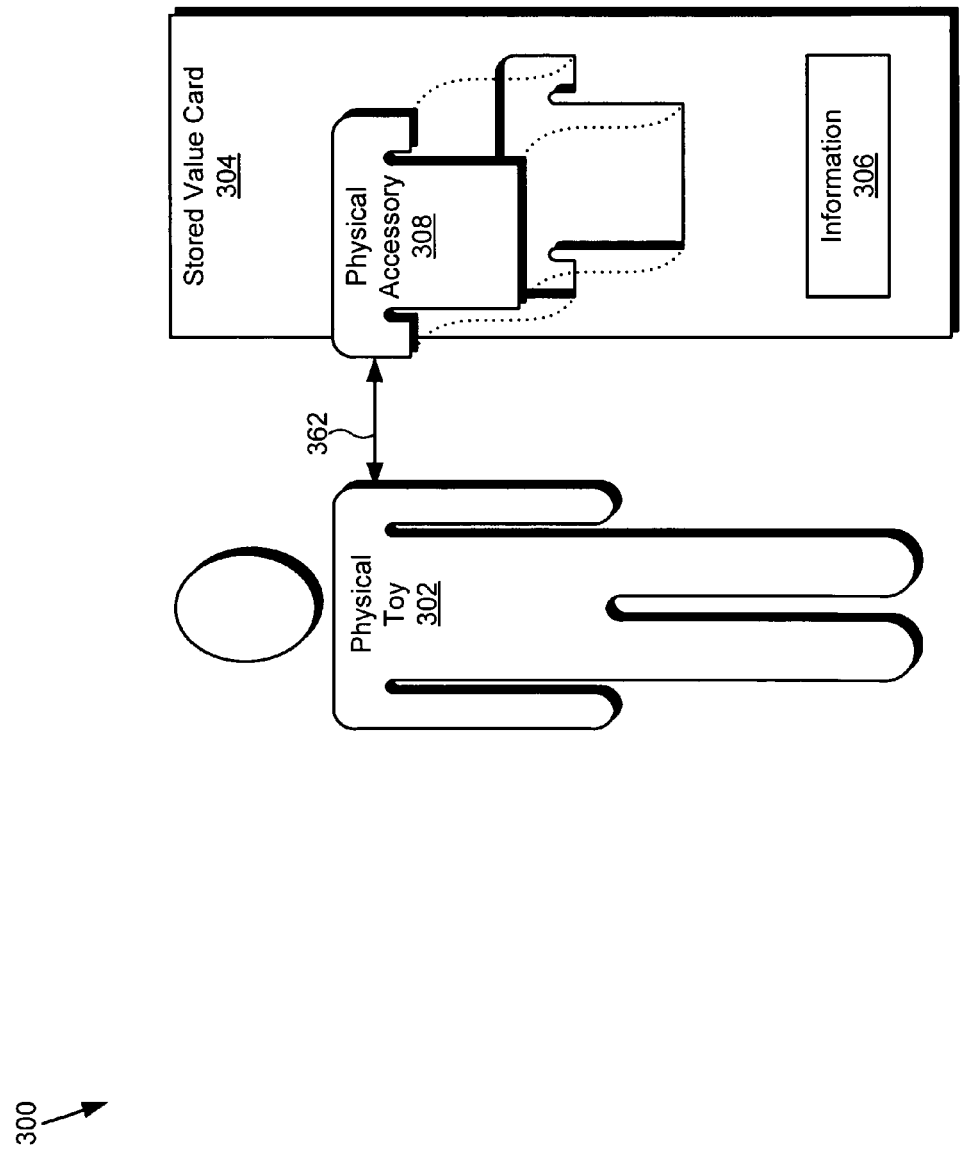
FIG. 3 shows a diagram of an exemplary system for microtransactional association of physical and virtual accessories, according to one embodiment of the present invention.

FIG. 3 shows exemplary system 300 according to one embodiment of the present invention. System 300 comprises stored value card 304 and physical toy 302, which correspond, respectively, to stored value card 204 and physical toy 102. Thus, stored value card 304 comprises physical accessory 308 and information 306 corresponding to physical accessory 208 and information 206, respectively, shown in FIG. 2. Like physical accessory 208, physical accessory 208 is shown in FIG. 3 as a shirt for physical toy 302, but in an embodiment where physical toy 302 is not implemented as a child's doll or figurine, for example, physical accessory 308 is an accessory appropriate to that embodiment's implementation of physical toy 302.

Physical accessory 308 is shown removed from stored value card 304 in FIG. 3. In an embodiment wherein stored value card 304 is implemented as, for example, a plastic or paper card, physical accessory 308 is shown as a detached portion of stored value card 304. In one embodiment, the child cut physical accessory 308 out of stored value card 304 on a dotted outline, for example, while in another embodiment the child carefully tore physical accessory 308 out of stored value card 304 on a die-cut line or partially-perforated line. After detaching physical accessory 308 from stored value card 304, the child can attach physical accessory 308 to physical toy 302 in transaction 362.

Physical accessory 308 can be attached to physical toy 302 in a variety of ways. For example, in one embodiment physical accessory 308 can be inserted behind a transparent layer of plastic of physical toy 302 so that physical accessory 308 is secured for display inside physical toy 302. In another embodiment, physical accessory 308 comprises flaps (not shown) that can be wrapped around physical toy 302 to secure physical accessory 308 onto a surface of physical toy 302. In yet another embodiment, physical accessory 308 is adhered to physical toy 302 using, for example, glue or tape. After attaching physical accessory 308 to physical toy 302, as discussed in relation to FIG. 3, and after associating virtual accessory 226 to virtual toy 224 as discussed in relation to FIG. 2, in one embodiment the child can utilize, or play with, an associated physical toy and physical accessory, and an associated virtual toy and virtual accessory.

Figure 4:
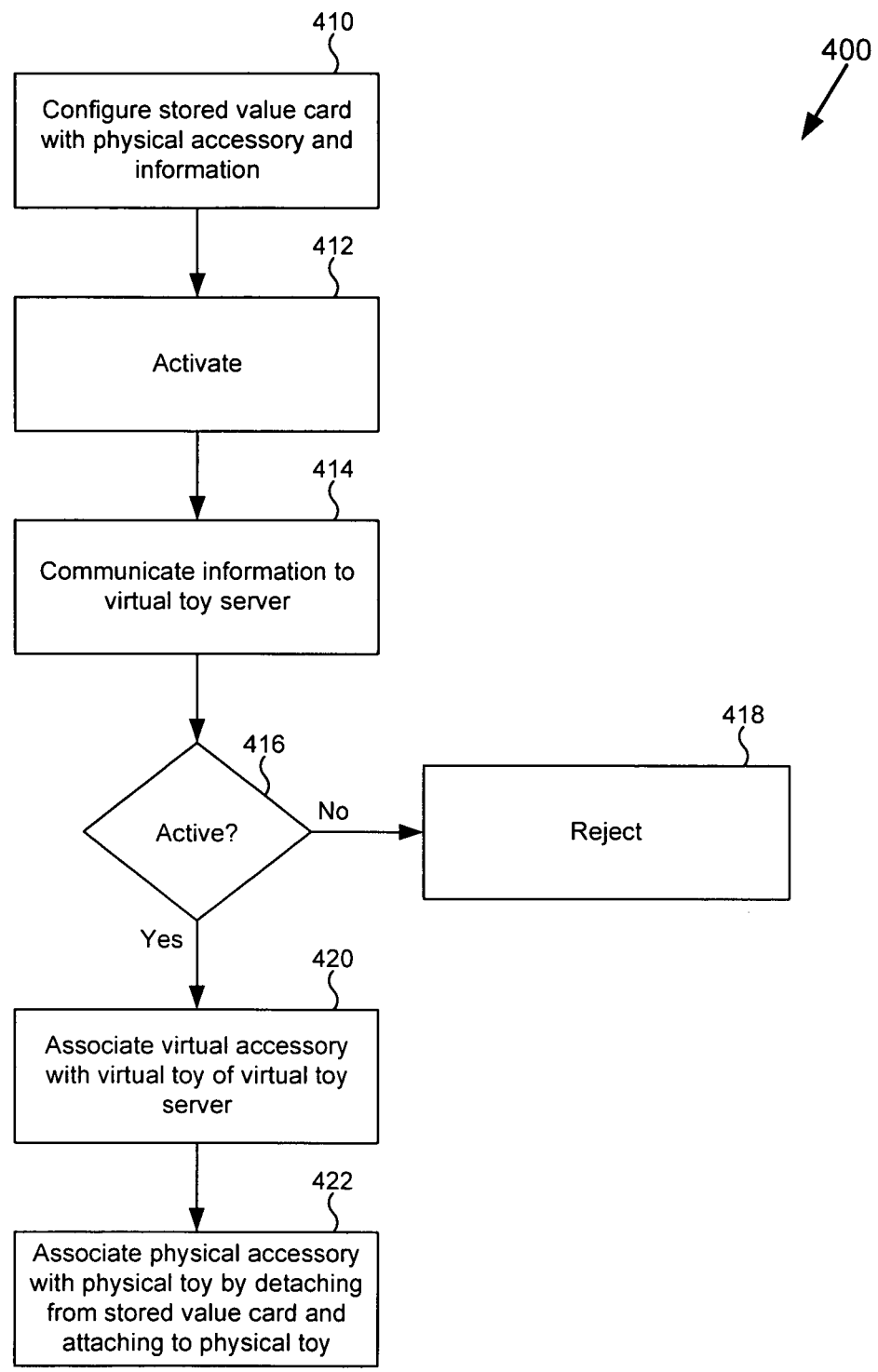
FIG. 4 shows a flowchart presenting an exemplary method for microtransactional association of physical and virtual accessories, according to one embodiment of the present invention.

FIG. 4 shows flowchart 400 of an exemplary method for microtransactional association of physical and virtual accessories, according to one embodiment of the present invention. Certain details and features have been left out of flowchart 400 that are apparent to a person of ordinary skill in the art. For example, a step may comprise one or more substeps or may involve specialized equipment or materials, as known in the art. While steps 410 through 422 indicated in flowchart 400 are sufficient to describe one embodiment of the present invention, other embodiments of the invention may utilize steps different from those shown in flowchart 400.

In step 410 of flowchart 400, a stored value card corresponding to stored value card 104 in FIG. 1 is configured with a physical accessory and an information corresponding, for example, to physical accessory 108 and information 106, respectively. In one embodiment, the stored value card, or prepaid card, is implemented as, for example, a plastic or paper card. The physical accessory is a detachable portion of the stored value card, such that the physical accessory can be cut out of, torn out of, or otherwise detached from the stored value card on a dotted outline, a die-cut line, or a partially-perforated line, for example. The information comprises, in one embodiment, a unique code or number stored as, for example, human-readable code, an optically-scannable barcode, a magnetic strip, or an RFID ("Radio Frequency Identification") device. The information uniquely identifies the stored value card, the physical accessory, and a virtual accessory, and is configured to be communicated, in one embodiment, via a point of sale computer corresponding to point of sale computer 112. In one embodiment, the stored value card has advantages derived from consignment in a manner similar to stored value card 104.

In step 412 of flowchart 400, the stored value card is activated. The stored value card may be activated, for example, after a child in a retailer selects stored value card for having a physical accessory suitable for a physical toy corresponding to physical toy 102. The child may bring the stored value card to the point of sale computer, where a clerk may utilize a bar code scanner, for example, to scan the information in a transaction corresponding to transaction 152. The Point of sale computer then communicates the information to a card server corresponding, for example, to card server 114 in a transaction corresponding to transaction 154 via the Internet, for example. The card server stores a card record corresponding to card record 116, which contains data about, for example, whether the information is valid and whether the stored value card has been purchased. After step 412 is complete, the card server has activated the card record and a subsequent inquiry to the card server (i.e., an inquiry in step 416, below) will show that the stored value card has been purchased.

In step 414 of flowchart 400, in one embodiment the information of the stored value card is communicated to a virtual toy server corresponding to virtual toy server 220. The child, in one embodiment, takes the stored value card home after activating the card record in step 412. At home, the child can utilize the stored value card to associate a virtual accessory corresponding to virtual accessory 226 with a virtual toy corresponding to virtual toy 224. In one embodiment, the virtual toy server provides a virtual toy website that is configured to provide a website account to the child. The website account has, for example, a feature for providing the virtual toy to children. In one embodiment, the child utilizes a home computer corresponding to home computer 218 to log in to or to activate the website account of the virtual toy website provided by the virtual toy server. Once logged in to the website account, the child provides the information via the home computer to the virtual toy server in transactions corresponding to transactions 256 and 258, thereby completing step 414.

In step 416 of flowchart 400, the virtual toy server communicates the information to the card server in a transaction corresponding to transaction 260 to determine whether the card record associated with the stored value card has been activated. The card record has been activated as described above in step 412, for example, and thus the card server responds to the virtual toy server in the affirmative to conclude the transaction corresponding to transaction 260. The card server is, in one embodiment, also configured to provide information about the virtual accessory to the virtual toy server. If the card record had not been activated as described above (e.g., because the clerk did not scan the information utilizing the point of sale computer) then flowchart 400 proceeds to step 418, thereby rejecting any association of the virtual accessory and the virtual toy. Otherwise, flowchart 400 proceeds to step 420.

In step 420 of flowchart 400, the virtual toy server associates the virtual accessory with the virtual toy. The virtual toy server may, for example, provide an image of the virtual accessory and the virtual toy on, for example, a screen of the home computer. The child may proceed to enjoy playing with the virtual toy and the virtual accessory in an online environment provided by the virtual toy server, mimicking, for example, child's play or dress-up play performed with a physical toy and virtually attach or dress-up the virtual toy or primary with the virtual accessory.

In step 422 of flowchart 400, the child associates the physical accessory with the physical toy by, for example, detaching the physical accessory from the stored value card and attaching the physical accessory to the physical toy. In one embodiment, the child cuts the physical accessory out of the stored value card on a dotted outline, for example, while in another embodiment the child carefully tears the physical accessory out of the stored value card on a die-cut line or partially-perforated line. Subsequently, the child may attach the physical accessory to the physical toy in a variety of ways in a transaction corresponding to transaction 362 of FIG. 3. For example, in one embodiment the physical accessory can be inserted behind a transparent layer of plastic, for example, of the physical toy so that the physical accessory is secured for display inside the physical toy. In another embodiment, the physical accessory comprises flaps (not shown) that can be wrapped around the physical toy to secure the physical accessory onto a surface of the physical toy. In yet another embodiment, the physical accessory adheres to the physical toy using, for example, glue or tape. Thus, at the conclusion of step 422 of flowchart 400, in one embodiment the child can utilize, or play with, an associated physical toy and physical accessory, and an associated virtual toy and virtual accessory.

In the manner described above, an embodiment of the present invention, shown in exemplary systems 100, 200, and 300, as well as in exemplary flowchart 400, achieves improved microtransactional association of physical and virtual accessories while overcoming the drawbacks of conventional solutions. In one embodiment, for example, a child utilizes a stored value card to associate a virtual toy with a virtual accessory, and a physical toy with a physical accessory, as described above. The drawbacks of conventional solutions, which include, for example, difficulty in applying microtransactional systems and methods in retail settings, are avoided.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A stored value card comprising:
a physical accessory being formed as a portion of the stored value card and being a detachable portion of the stored value card, such that detaching the physical accessory from the stored value card creates an opening within the stored value card, wherein the physical accessory is configured to be attached to a physical primary; and
a unique identification code, wherein the unique identification code uniquely identifies the stored value card, the physical accessory and a virtual accessory, and wherein a virtual primary and the virtual accessory are stored in a network server and correspond to the physical primary and the physical accessory, respectively.

2. The stored value card of claim 1, wherein the unique identification code is one of a human-readable code, an optically-scannable code, a magnetic strip, and an RFID (Radio Frequency Identification) device.

3. The stored value card of claim 1, wherein the unique identification code uniquely identifies the virtual accessory.

4. The stored value card of claim 1, wherein the virtual accessory and the virtual primary are virtual copies of the physical accessory and the physical primary, respectively.

5. The stored value card of claim 1, wherein the stored value card is constructed such that the physical accessory is cut out of the stored value card on one of a dotted outline, a die-cut and a partially-perforated line.

6. The stored value card of claim 1, wherein the virtual accessory is configured to be virtually attached to the virtual primary.

7. The stored value card of claim 1, wherein the opening is a hole within the stored value card and completely bounded by the stored value card.

8. The stored value card of claim 1, wherein the virtual primary and the virtual accessory stored in the network server are accessible via a website.

9. A system for associating physical and virtual items, the system comprising:
- a physical accessory being formed as a portion of the stored value card and being a detachable portion of the stored value card, such that detaching the physical accessory from the stored value card creates an opening within the stored value card, wherein the physical accessory is configured to be attached to a physical primary;
- a unique identification code, wherein the unique identification code uniquely identifies the stored value card, the physical accessory and a virtual accessory; and
- a network server storing a virtual primary and the virtual accessory, wherein the virtual primary and the virtual accessory correspond to the physical primary and the physical accessory, respectively.

10. The system of claim 9, wherein the unique identification code is one of a human-readable code, an optically-scannable code, a magnetic strip, and an RPM (Radio Frequency Identification) device.

11. The system of claim 9, wherein the unique identification code uniquely identifies the virtual accessory.

12. The system of claim 9, wherein the virtual accessory and the virtual primary are virtual copies of the physical accessory and the physical primary, respectively.

13. The system of claim 9, wherein the stored value card is constructed such that the physical accessory is cut out of the stored value card on one of a dotted outline, a die-cut and a partially-perforated line.

14. The system of claim 9, wherein the virtual accessory is configured to be virtually attached to the virtual primary.

15. The stored value card of claim 9, wherein the opening is a hole within the stored value card and completely bounded by the stored value card.

16. The system of claim 9, wherein the wherein the virtual primary and the virtual accessory stored in the network server are accessible via a website.

17. A method of constructing a stored value card for physical and virtual applications, the method comprising:
- making a physical accessory being formed as a portion of the stored value card and being a detachable portion of the stored value card, such that detaching the physical accessory from the stored value card creates an opening within the stored value Card, wherein the physical accessory is configured to be attached to a physical primary; and
- providing a unique identification code uniquely identifying the stored value card, the physical accessory and a virtual accessory,
- designing a virtual primary and the virtual accessory corresponding to the physical primary and the physical accessory, respectively; and
- storing the virtual primary and the virtual accessory in a network server.

18. The method of claim 17, wherein the virtual accessory is a virtual copy of the physical accessory.

19. The method of claim 17, wherein the opening is a hole within the stored value card and completely bounded by the stored value card.

20. The stored value card of claim 17, wherein the wherein the virtual primary and the virtual accessory stored in the network server are accessible via a website.

* * * * *

UNITED STATES PATENT AND TRADEMARK OFFICE
CERTIFICATE OF CORRECTION

PATENT NO. : 9,501,729 B2
APPLICATION NO. : 12/291764
DATED : November 22, 2016
INVENTOR(S) : Heatherly et al.

Page 1 of 1

It is certified that error appears in the above-identified patent and that said Letters Patent is hereby corrected as shown below:

In the Claims

Column 9, Line 23, "RPM" should be changed to --RFID--

Column 10, Line 14, "Card" should be changed to --card--

Signed and Sealed this
Fifteenth Day of May, 2018

Andrei Iancu
*Director of the United States Patent and Trademark Office*